United States Patent [19]

Ogawa

[11] Patent Number: 5,001,508
[45] Date of Patent: Mar. 19, 1991

[54] RANGE FINDER

[75] Inventor: Kimiaki Ogawa, Tokyo, Japan

[73] Assignee: Asahi Kogaku Kogyo K.K., Tokyo, Japan

[21] Appl. No.: 541,439

[22] Filed: Jun. 22, 1990

Related U.S. Application Data

[63] Continuation of Ser. No. 305,134, Feb. 2, 1989, abandoned.

[30] Foreign Application Priority Data

Feb. 13, 1988 [JP] Japan .................................. 63-31289
Feb. 19, 1988 [JP] Japan .................................. 63-36730

[51] Int. Cl.$^5$ ........................ G03B 13/36; G01C 3/08
[52] U.S. Cl. ...................... 354/403; 356/1; 356/4
[58] Field of Search ....................... 354/403; 356/1, 4

[56] References Cited

U.S. PATENT DOCUMENTS

4,589,773 5/1986 Ido et al. ........................... 356/1 X

Primary Examiner—W. B. Perkey
Attorney, Agent, or Firm—Sughrue, Mion, Zinn, Macpeak & Seas

[57] ABSTRACT

A range finder for an automatic camera in which the average total power required for driving the ranging light source is significantly reduced. In accordance with a first aspect of the invention, the intensity of the light emitted by the ranging light source is controlled in accordance with the detected intensity of the reflected light in such a manner that the intensity of light emitted by the light source is reduced to the minimum necessary for carrying out distance calculations. In accordance with a second aspect of the invention, the number of pulses of light emitted from the ranging light source is controlled in accordance with the detected reflected light intensity so that a minimum number of light pulses is emitted consistent with the minimum necessary for carrying out distance calculations.

12 Claims, 5 Drawing Sheets

RANGE FINDER

This is a continuation of application Ser. No. 07/305,134, filed Feb. 2, 1989, now abandoned.

BACKGROUND OF THE INVENTION

The present invention relates to a range finder for use in a camera or the like for automatically measuring a distance to a subject in photographing.

Figure 1:
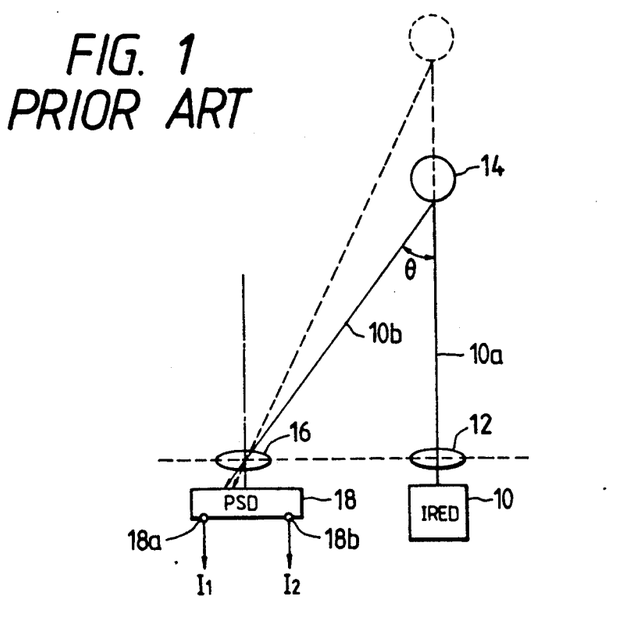
FIG. 1 is a diagram for explaining the fundamental operation of a range finder.

As an active range finder, there has been proposed a system such as that shown in FIG. 1.

Light 10a emitted from a light source 10, for example, an infrared-ray source or the like, is projected onto a subject 14 through a lens system 12, and reflected light 10b from the subject 14 is projected onto a light detecting element 18 through a lens system 16 so as to form a light spot.

The light detecting element 18 functions as a position-sensitive detector, that is, a position detector, in which the values of currents $I_1$ and $I_2$ obtained from electrodes 18a and 18b, respectively, vary depending on the position of the light spot. On the basis of this fact, an angle $\theta$ between the respective optical axes of the projection light 10a and the reflected light 10b is obtained from the ratio of the current $I_1$ to the current $I_2$, and the distance to the subject 14 is determined by the angle $\theta$.

However, if the light spot formed on the light detecting element 18 is weak, the processing operation of a distance operation circuit cannot be performed because the noise level will be too high, and therefore it is necessary to make the respective values of the currents $I_1$ and $I_2$ large enough to ensure that calculating processing can always be carried out. A large current is therefore always supplied to the light source 10 in ranging so as to cause the light source 10 to emit intensive light, the light intensity being determined taking into consideration the worst-case ranging conditions, namely, where the subject 14 is far and the light reflection factor is low.

In order to perform ranging, however, it is a sufficient condition to obtain the ratio of the current $I_1$ to the current $I_2$. Hence, the absolute values of the currents $I_1$ and $I_2$ are not required. It is therefore wasteful to cause the light source 10 to emit intense light under good ranging conditions where the subject 14 is near and the reflection factor of the subject is high because of the useless consumption of electric power. Particularly in the case where a battery is used as the power supply, there has been a problem in that the rate of consumption of the battery is so large that the number of times or cycles a ranging operation can be carried out without changing the battery is small.

There is a further problem in that if the light source 10 is always caused to emit intense light, the light source 10 is apt to deteriorate, resulting in the generation of electrical noise due to the presence of a pulse-like large current. Such noise can adversely affect the operation of peripheral circuits. Noise often affects the distance calculation circuit to make its processing operation inaccurate.

In order to reduce the influence of electrical noise, multiple ranging operations are typically continuously and successively performed several or ten-odd times and the average of the determined distances is used as the final distance value. Ranging operations carried out successively through plural times or cycles are herein termed "one ranging". The time required for one ranging is generally about 100 msec.

The number of times or cycles in "one ranging" is fixedly set to a considerably large value taking into consideration the worst-case conditions where the subject 14 is far away and the reflection factor of the subject is low.

Under good ranging condition where the subject 14 is near and the reflection factor of the subject is high, however, the light spot on the light detecting element 18 is so intense as to increase the values of the currents $I_1$ and $I_2$ obtained from the light spot to such a level that the distance calculation circuit is hardly affected by noise. That is, one ranging operation would suffice to provide accurate ranging calculations. Therefore, to perform such a large number of times or cycles in "one ranging" under good ranging conditions is not only meaningless but wasteful in terms of electric power consumption. In cameras employing a high degree of automation, for example, automatic film winding, autofocusing, and the like, the amount of wasted power can be quite significant.

Further, the time taken for "one ranging" is unnecessarily long, so that in a camera in which autofocusing is performed using the average of plural ranging operations, there has been a problem that the focusing operation is delayed correspondingly.

SUMMARY OF THE INVENTION

An object of the present invention, therefore, is to provide a range finder in which a drive current supplied to a light source can be automatically changed in accordance with the condition of the subject being photographed.

Another object of the present invention is to provide a range finder in which the number of times or cycles in "one ranging" is automatically changed in accordance with the amount of light reflected from the subject to avoid consumption of the battery and to make it possible to reduce the time taken for "one ranging".

To attain the above objects, according to one aspect of the present invention, a range finder is provided comprising light detecting means for detecting the intensity of received light; distance calculation means for determining a distance to a target subject on the basis of an output of the light detecting means; setting means for presetting a minimum value of the entire output of the light detecting means which can be processed in the distance calculation means; drive means for controlling the intensity of a light source used for irradiating the target subject; and control means receiving the respective outputs of the light detecting means and the setting means and in response supplying a control signal related to the respective outputs of the light detecting means and the setting means to the drive means so that the drive means controls the intensity of the light source in accordance with the control signal.

According to another aspect of the present invention, the invention provides a range finder comprising: a light source for irradiating a target subject; light detecting means for detecting an intensity of light reflected from the subject; distance calculation means for determining a distance to the target subject on the basis of an output of the light detecting means; means for averaging the values of distance calculation successively applied to the averaging means from the distance calculation means, the values of distance calculation being successively obtained in the distance calculation means through plural times of distance determining operations on the basis of plural times of light emission by the light source, and for producing the thus-obtained average as an output representing the value of distance determined by the range finder; and control means responsive to the output of the light detecting means for setting the number of times of light emission of the light source on the basis of the value of the light detecting means to thereby control the distance determining operations.

BRIEF DESCRIPTION OF THE DRAWINGS

Other features and advantages of the present invention will be apparent from the following description taken in connection with the accompanying drawings, wherein.

DESCRIPTION OF THE PREFERRED EMBODIMENTS

Figure 2:
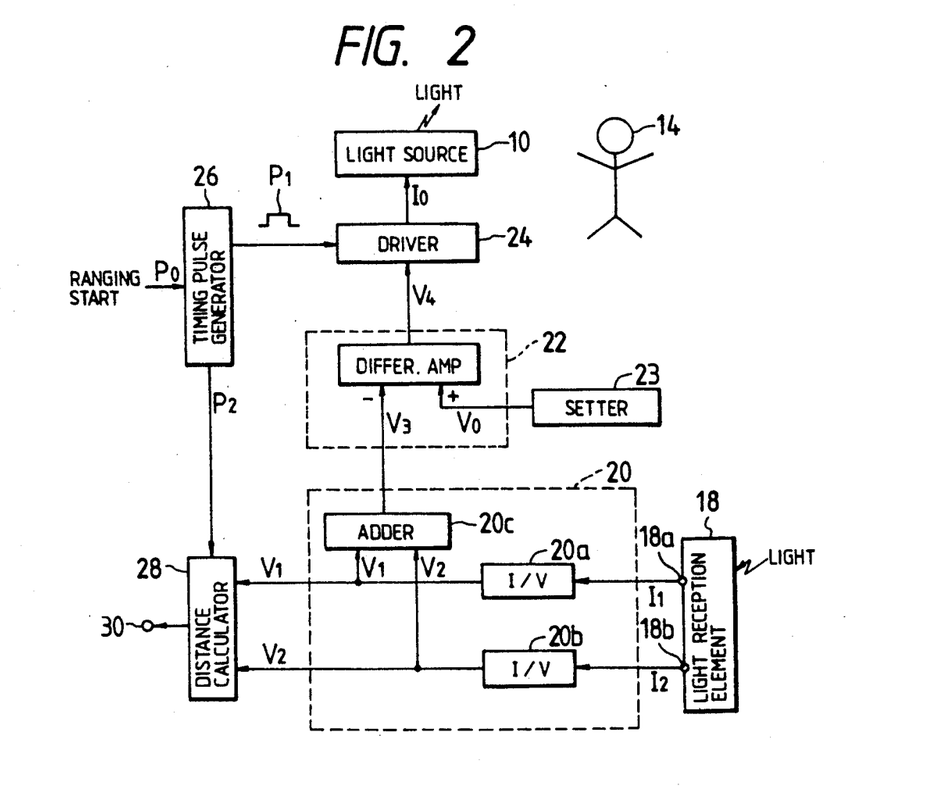
FIG. 2 is a block diagram showing a first embodiment of the range finder according to the present invention.

First Embodiment:

FIG. 2 is a block diagram showing main portions of a first embodiment of the present invention.

Currents $I_1$ and $I_2$ from a light detecting element 18 are respectively supplied to current-to-voltage converters (hereinafter referred to as "I/V converters") 20a and 20b constituting a part of a summing operational unit 20, and the output voltages $V_1$ and $V_2$ of the I/V converters 20a and 20b are applied to an adder 20c constituting the remainder of the summing operational unit 20 so that the calculation of $V_1 + V_2 = V_3$ is performed.

The output voltage $V_3$ of the adder 20c is applied to a control unit 22. In a setting circuit 23, a set value is converted into a voltage $V_0$, which is applied to the control unit 22. In this embodiment, the control unit 22 is constituted by a differential amplifier.

The output voltage $V_4$ of the control unit 22, obtained on the basis of the difference between the voltages $V_0$ and $V_3$, is applied to a driver 24.

A timing pulse generator 26 generates a pulse $P_1$ in response to a signal applied thereto from a release shutter button (not shown) or the like (for example, the signal being generated by the turning-on of a switch upon depressing the release shutter button), the pulse $P_1$ being supplied to the driver 24. As a result, the voltage $V_4$, or a current $I_0$ converted from the voltage $V_4$, is supplied to a light source 10 so as to cause the light source 10 to emit light having an intensity corresponding to the value of the voltage $V_4$ or the current $I_0$.

The timing pulse generator 26 further generates another pulse $P_2$ a predetermined delay from the generation of the pulse $P_1$, the pulse $P_2$ being supplied to a distance calculator 28. Upon reception of the pulse $P_2$, the distance calculator 28 calculates the distance to the subject on the basis of the voltages $V_1$ and $V_2$, the resultant value being applied to an output terminal 30.

Next, referring to FIG. 3, the operation of the first embodiment will be described. The setting circuit 23 is arranged so that the minimum value of all the output currents $I_1 + I_2$ of the light detecting element 18 can be processed by the distance calculator 28. The upper limit of the output current of the driver 24 is a value sufficient to overcome the worst-case ranging conditions.

If the switch of the shutter button or the like is actuated to generate the pulse $P_0$ (waveform A in FIG. 3) at a point of time $t_1$, the timing pulse generator 26 generates the pulse $P_1$ (waveform B in FIG. 3) a predetermined delay from the point of time $t_1$. In FIG. 3, the points of time at which the leading and trailing edges of the pulse $P_1$ occur are $t_2$ and $t_4$, respectively, and the period of the pulse $P_1$ from the point of time $t_2$ to the point of time $t_4$ is designated as $T_1$. The pulse $P_1$ is supplied to the driver 24, so that the light source 10 is caused to emit light in accordance with the value of the current $I_0$.

The reflected light from the subject will not have reached the light detecting element 18 at the instant of the rise of the pulse $P_1$, and therefore the voltage at that instant $V_3$ is exceedingly small or zero, that is, the voltage $V_3$ is lower than the voltage $V_0$ from the setting circuit 23. At the point of time $t_2$, therefore, the voltage $V_4$ from the control unit 22 is a maximum, and hence the current $I_0$ (waveform C in FIG. 3) is also a maximum. Accordingly, the intensity of light emitted by the light source 10 is at its maximum level.

When the reflected light reaches the light detecting element 18, the voltage $V_3$ rises. If the reflection factor of the subject is high, the value of the voltage $V_3$ (shown as $V_{31}$ in waveform D in FIG. 3) rises considerably beyond the set voltage $V_0$ indicated in waveform D in FIG. 3, and therefore the output voltage $V_4$ from the control unit 22 rapidly falls that is, the current $I_0$ rapidly becomes small, so that the intensity of light of the light source 10 rapidly decreases.

Thus, the intensity of light of the light source 10 is fixed and stabilized after a point of time in which the incidence of the reflected light on the light detecting element 18 has decreased rapidly and the voltage $V_3$ has fallen rapidly so that the voltage $V_3$ is made to correspond to the set value $V_0$ from the setter 23. At the point of time $t_4$, light emission from the light source is stopped.

Figure 3:
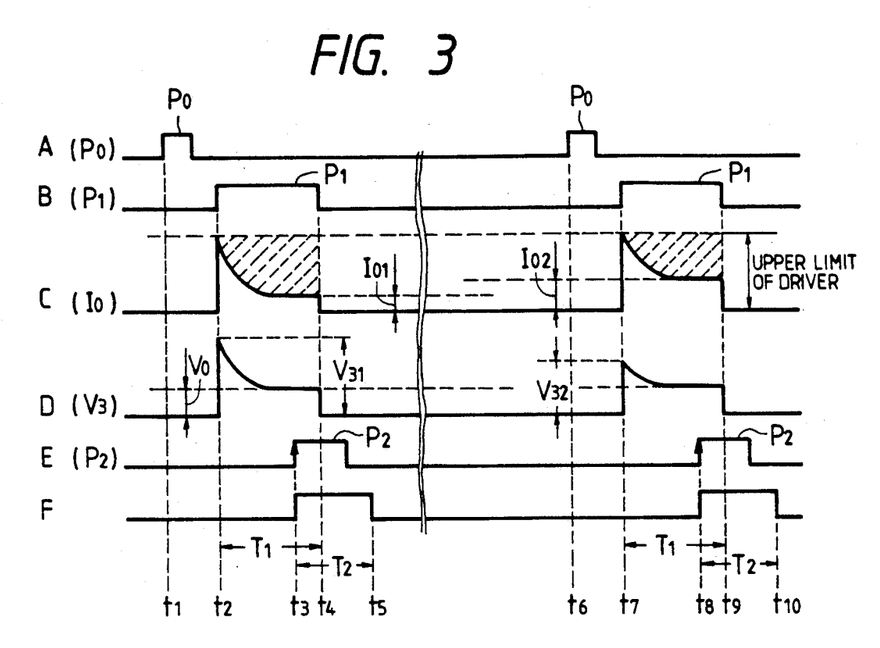
FIG. 3 is a timing chart for explaining the operation of the first embodiment.

The pulse $P_2$ is generated by the timing pulse generator 26, as shown in waveform E of FIG. 3, in a period $T_2$ from the point of time $t_3$ to the point of time $t_5$ in which the intensity of light emission has been substantially stabilized, so that the distance calculation is carried out by the distance calculator 28 in response to the pulse $P_2$, the result of calculation being provided upon the output terminal 30. The larger the change in current, the larger the noise level. The noise level at the point of time $t_4$ in the period of distance calculation is so reduced in comparison with the conventional system that erroneous calculations due to noise are greatly reduced, making it possible to obtain a more accurate measurement value.

Next, when the shutter button is depressed again at a point of time $t_6$, the pulse $P_1$ is generated during a period $T_1$ from a point of time $t_7$ to a point of time $t_9$, and the current $I_0$ is supplied to the light source 10 to cause the light source 10 to emit light in the same manner as in the preceding cycle. The value of the current $I_0$ at the point of time $t_7$ is the same as that at the point of time $t_2$. If the reflection factor of the subject 14 is low and the reflected light incident on the light detecting element 18 is weaker than that in the preceding cycle, the initial value of the voltage $V_3$ in this cycle (shown as $V_{32}$ in waveform D in FIG. 3) is smaller than that at the point of time $t_2$, so that the current $I_0$ gently or gradually decreases in comparison with that in the preceding cycle.

However, the voltage $V_3$ comes to correspond to the set value $V_0$ so as to be stable at a point of time at which the current $I_0$ has not yet decreased to the current value in the preceding cycle because the reflected light is weak in this cycle. Let the value of the current $I_{01}$ in the stabilized state and let the value of the same in the present cycle be $I_{02}$, then the relation that $I_{01} < I_{02}$ is established. Thus, the light output of the light source 10 stabilizes at a level larger than that in the preceding cycle.

In either cycle, since the current $I_0$ is attenuated corresponding to the intensity of the reflected light, the power consumption is reduced in comparison with the conventional system. That is, the energy corresponding to the portion indicated in hatching by broken lines in waveform C in FIG. 3 is saved.

Figure 4:
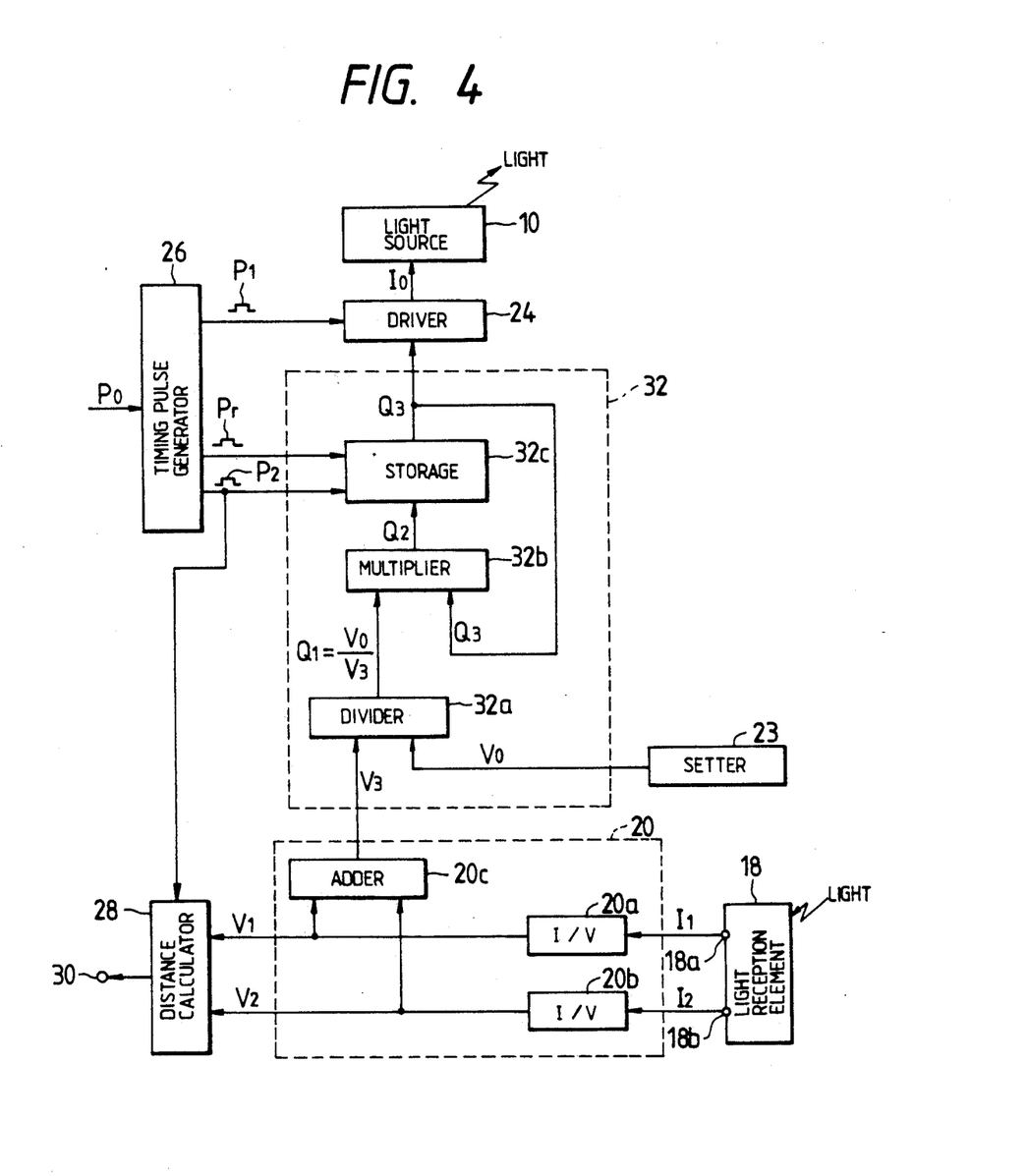
FIG. 4 is a block diagram showing a second embodiment of the present invention.

Second Embodiment:

FIG. 4 is a block diagram showing a main portion of a second embodiment of a range finder constructed according to the present invention. The arrangement of FIG. 4 is the same as that of FIG. 2 except that a different control unit 32 is provided in place of the control unit 22 of FIG. 2. In the embodiment of FIG. 4, parts corresponding to those of FIG. 2 are correspondingly referenced, and a further explanation about those parts is omitted.

The control unit 32 in this embodiment is constituted by a divider 32a, a multiplier 32b, and a storage unit 32c.

The output voltage $V_0$ of the setting circuit 23 and the output voltage $V_3$ of the adder 20c are applied to the driver 32a so that a calculation of $V_0 \div V_3$ is performed to obtain a value $Q_1$.

The output value $Q_1$ of the divider 32a is applied to the multiplier 32b where the value $Q_1$ is multiplied by a value $Q_3$, which will be described later, thereby obtaining an output $Q_2$.

The output $Q_2$ of the multiplier 32b is applied to the storage unit 32c so as to be stored therein, and the stored value is applied as an output $Q_3$ of the storage unit 32b to the multiplier 32b as well as the driver 24.

When a reset signal $P_r$ produced from the timing pulse generator 26 is applied to the storage unit 32c, the stored value $Q_3$ is reset to an initial value.

Figure 5:
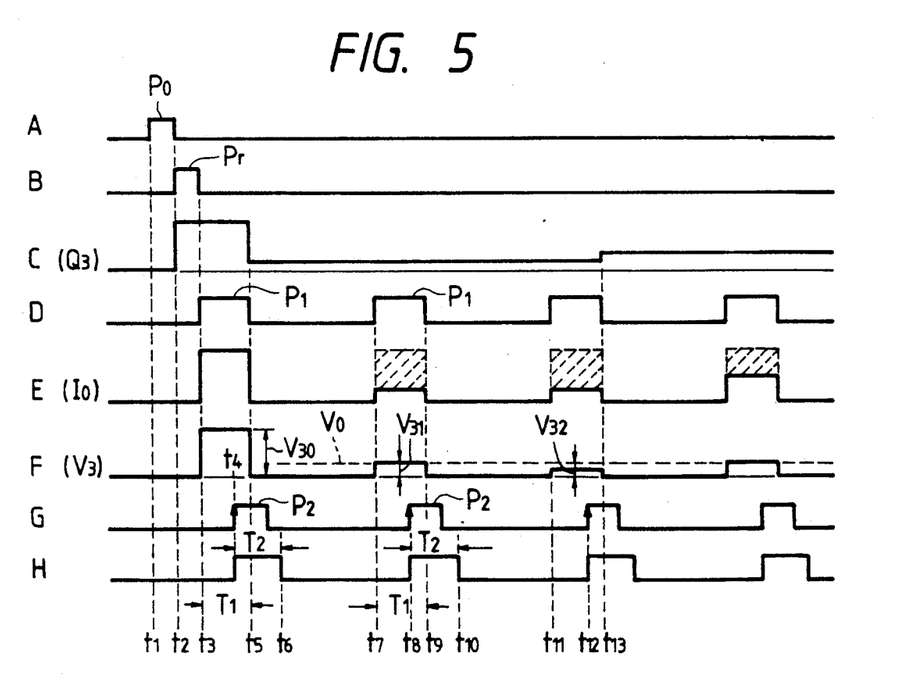
FIG. 5 is a timing chart for explaining the operation of the second embodiment.

The operation of the second embodiment will be described with reference to the timing chart of FIG. 5. In FIG. 5, portions corresponding to those of FIG. 3 are correspondingly referenced.

When the start switch is turned on (waveform A in FIG. 5) at a point of time $t_1$, a reset pulse $P_r$ (waveform B in FIG. 5) is generated by the timing pulse generator 26 at the trailing edge of a pulse $P_0$ (at a point of time $t_2$), and hence the storage unit 32c is reset so that the stored value $Q_3$ is initialized. The initial value is selected to be large taking the foregoing worst-case ranging conditions into consideration. Waveform C in FIG. 5 shows the value $Q_3$.

A pulse $P_1$ is generated by the timing pulse generator 26 at the trailing edge of the reset pulse $P_r$, (at a point of time $t_3$) as indicated by waveform D in FIG. 5 and applied to the driver 24. As a result, a large current $I_0$ is supplied from the driver 24 to the light source 10, as shown in waveform E in FIG. 5, so that the light source 10 is caused to emit light at a high level. The period from the point of time $t_3$ to the point of time $t_5$ is the light-emitting period $T_1$. In this embodiment, the value of the current $I_0$ in the period $T_1$ is fixed, and the light source 10 is caused to emit light with a fixed intensity during the period $T_1$.

Further, the calculation of $V_0 \div V_3$ is performed by the divider 32a in the period $T_1$. At this time, a voltage $V_3$ (in waveform F in FIG. 5) satisfies the relation of $V_3 > V_0$, and the output value $Q_1$ of the divider 32a is smaller than unity (1). As a result, the product of the multiplication of $Q_1 \times Q_3 = Q_2$ performed by the multiplier 32b is relatively small (smaller than $Q_3$). The value of $W_2$ is stored as the value $Q_3$ in the storage unit 32c in response to a pulse $P_2$ (waveform G in FIG. 5) generated by the timing pulse generator 26. That is, the old large value of $Q_3$ at the time of resetting (at the point of time $t_3$) is rewritten with a new value which is smaller than the old large value. At the same time, the distance calculation $V_1 \div V_2$ is performed by the distance calculator 28 (in waveform H of FIG. 5). $T_2$ represents the operational period. Thus, the first cycle of light emission has been completed.

The pulse $P_1$ is generated again by the timing pulse generator 26 at a point of time $t_7$, and the light source 10 is energized to emit light with the current $I_0$ having a value corresponding to the value of $Q_3$ stored in the storage unit 32c ($V_0/V_{30}$ times as large as that in the first cycle of light emission). Being proportional to the current $I_0$, the magnitude of light emitted in the present cycle is $V_0/V_{30}$ times as large as that in the preceding cycle. Although the light emission is continued with a fixed intensity during the period $T_1$ from a point of time $t_7$ to a point of time $t_9$, the light emission is only $V_0/V_{30}$ times as intense as that in the preceding cycle. The reflected light is therefore only $V_0/V_{30}$ times as intense as that in the preceding cycle. A voltage $V_{31}$ ($V_{31} = V_{30} \times V_0/V_{30} = V_0$) owing to the reflected light coincides with the set value $V_0$ in the period $T_1$ from the point of time $t_7$, to the point of time $t_9$ in FIG. 5. The calculation of $V_0 \div V_{31} = Q_1$ is performed by the divider 32a, with the value of $Q_1$ being unity (1) in the present cycle. The calculation of $Q_1 \times Q_3 = Q_2$ is performed by the multiplier 32b, and the value $Q_2$ becomes equal to $Q_3$ in the present cycle. Accordingly, although the stored contents of the storage unit 32c are rewritten at a point of time $t_8$, the rewritten contents are the same as after light emission in the first cycle. Thus, the second cycle of light emission has been completed.

Further, the pulse $P_1$ is generated by the timing pulse generator 26 at a point of time $t_{11}$ and the light emitting operation is performed in the same manner as in the foregoing cycles. Also in the present cycle, that is, the third cycle, relatively weak light emission is performed, as shown in the period from a point of time $t_{11}$ to a point of time $t_{13}$ in waveform E of FIG. 5, because the value $Q_3$ in the second cycle of light emission is stored in the storage unit 32c.

If the reflected light is so weak that the value of $V_{32}$ is smaller than the value of $V_0$ ($V_{32} < V_0$) for light emission in the third cycle, the value ($V_0/V_{32}$) of $Q_1$ becomes larger than unity (1), so that the value of $Q_3$ which has been stored in the storage unit 32c in the light emission of the third cycle is replaced with a value larger than the old value of $Q_3$. In the succeeding cycle of light emission, a suitable light emission intensity is obtained on the basis of the thus-corrected value of $Q_3$.

In the second embodiment, the intensity of light emission in each succeeding cycle is controlled on the basis of the state of the reflected light in the preceding cycle. Therefore, in the case where ranging is performed on the basis of the average of measurement values obtained through several or ten-odd times or cycles of ranging operations, the light emission intensity after the second cycle is controlled to a suitable value, and consequently, wasteful large consumption of energy is avoided.

Third Embodiment:

A third embodiment of the present invention will be described with reference to FIGS. 6 through 8 of the accompanying drawings.

Figure 6:
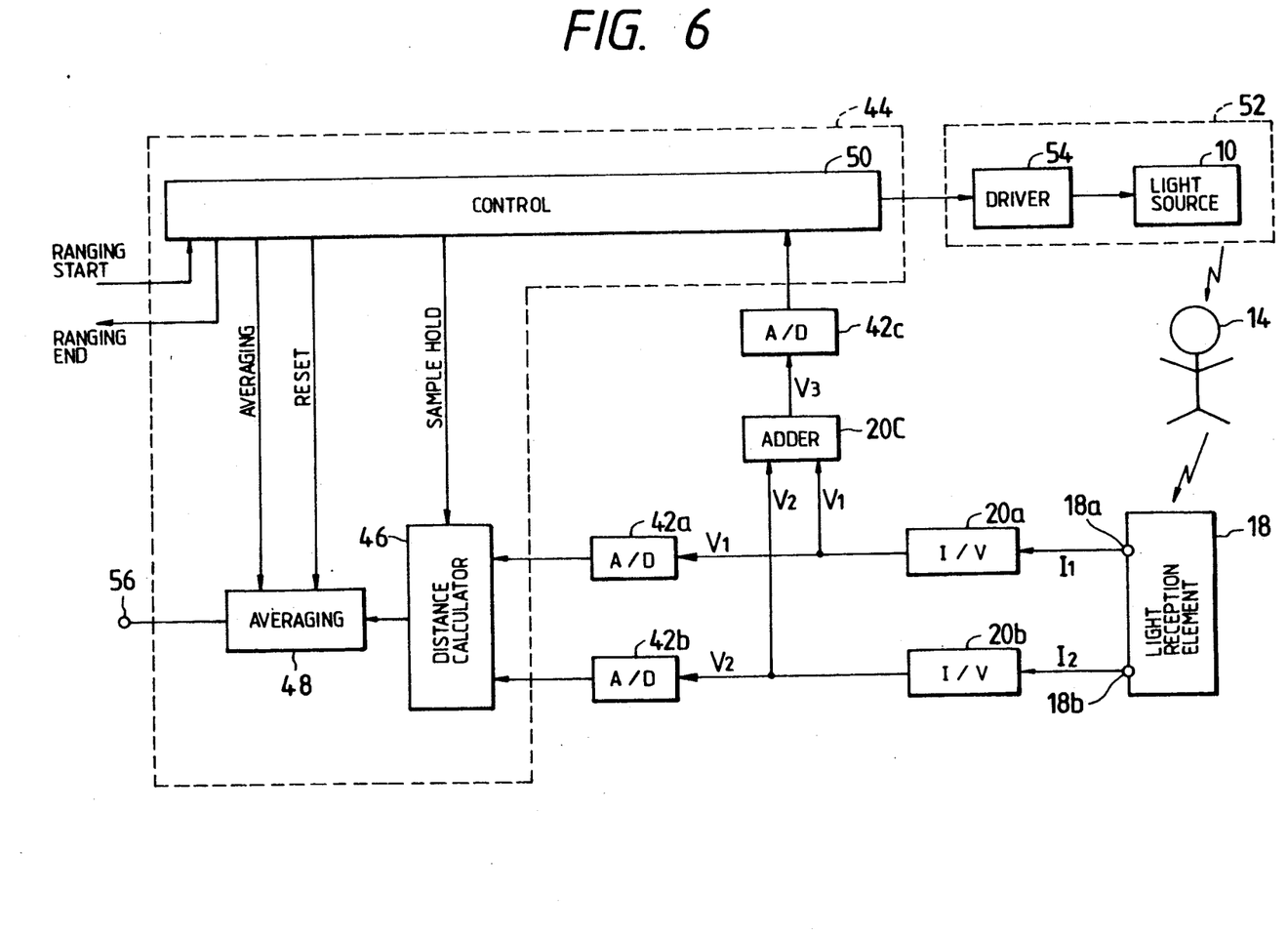
FIG. 6 is a block diagram showing a third embodiment of the present invention.

FIG. 6 is a block diagram showing a main portion of the third embodiment.

Currents $I_1$ and $I_2$ from a light detecting element 18 are supplied to I/V converters 20a and 20b, respectively, and the respective output voltages $V_1$ and $V_2$ of the I/V converters 20a and 20b are applied to an adder 20c where the calculation of $V_1 + V_2 = V_3$ is performed.

The respective output voltage $V_1$ and $V_2$ of the I/V converters 20a and 20b are applied also to A/D converters 42a and 42b, and the output voltage $V_3$ of the adder 20c is applied to an A/D converter 42c where the voltages $V_2$, $V_2$ and $V_3$ are converted into digital values and applied to a microcomputer 44.

The operation program for the microcomputer 44 is composed of function blocks of a distance calculating portion 46, an averaging portion 48, and a control portion 50. The output values of the A/D converters 42a and 42b are applied to the distance calculating portion 46, and the output value of the A/D converter 42c is applied to the control portion 50.

When a light-emission signal is issued from the control portion 50 to a driver 54, a light source 10 is energized to emit light, for example, infrared light or the like. The conditions of light emission (the intensity of the light and the period of light emission) are fixed for plural times or cycles in "one ranging".

Figure 7:
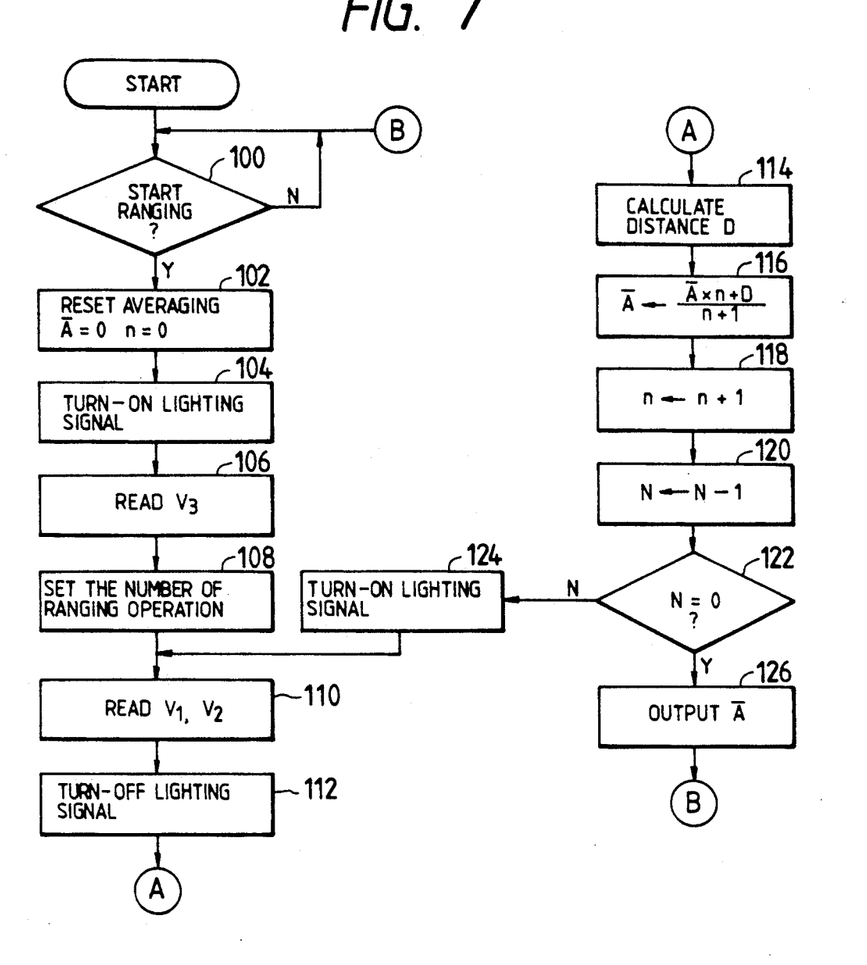
FIG. 7 is a flowchart for explaining the operation of the third embodiment.
Figure 8:
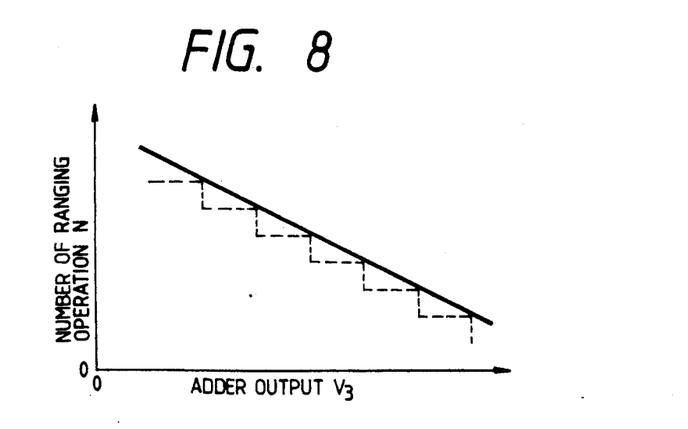
FIG. 8 is a diagram showing the relation between the output of the light detecting element and the number of times or cycles in "one ranging".

FIG. 7 is a flowchart provided for explaining the operation of the circuit of the third embodiment.

In Step 100, when the release button of a camera (not shown) is depressed part way, a switch (not shown) associated with the release button is turned on so that a ranging start command is applied to the control portion 50.

In Step 102, a reset command is applied from the control portion 50 to the averaging portion 48 so that the average A stored in the averaging portion 48 is reset to zero and also a count $\underline{n}$ is reset to zero.

In Step 104, a light emission signal is sent from the control portion 50 to the driver 54 so as to cause the light source 10 to emit light.

In Step 106, reflected light from a subject 14 is incident on the light detecting element 18, and the digital value of the voltage $V_3$ of the adder 20c is applied to the control portion 50.

In Step 108, the number of times of light emission of the light source 10 in "one ranging", that is, the number of times or cycles N of "one ranging", is set in the control portion 50 in accordance with the value of the voltage $V_3$. FIG. 8 shows the relation between the voltage $V_3$ and the number of times or cycles N in "one ranging". As is apparent from the drawing, the higher the voltage $V_3$ rises, the number of times or cycles N in "one ranging" is reduced. Both factors may be changed linearly as shown by a solid line or stepwise as shown by a dotted line.

In Step 110, the respective digital values of the output voltages $V_1$ and $V_2$ of the I/V converters 20a and 20b are supplied to the distance calculating portion 46, and on the other hand, a sample-and-hold command is applied from the control portion 50 to the distance calculating portion 46 so as to hold the respective values of the voltages $V_1$ and $V_{21}$. Sampling is carried out at a point of time when the voltages $V_1$ and $V_2$ have become stable.

In Step 112, the lighting signal is stopped being sent from the control portion 50 to the driver 54 so as to cause the light source 10 to stop light emission.

In Step 114, distance calculation is performed in the distance calculating portion 46 on the basis of the sampled values so as to obtain a subject distance D.

In Step 116, the subject distance D is applied to the averaging portion 48 so that the average A is obtained in accordance with an averaging command from the control portion 50. In the beginning, since the averaging portion 48 is in the reset state, the subject distance D obtained at the first cycle is set to the value of the average A.

In Step 118, the count value $\underline{n}$ is increased by one (at the first cycle, n=1).

In Step 120, the number of times or cycles N in "one ranging" is decreased by one.

In Step 122, judgment is made as to whether the number of times or cycles N in "one ranging" is equal to 0 or not. If not, Step 122 is shifted to Step 124.

In Step 124, the light emission signal is sent from the control portion 50 to the driver 54 so as to energize the light source 10 to emit light.

The same operation as the foregoing is repeated thereafter. The count value $\underline{n}$ is successively increased in Step 118, and the average $\overline{A}$ is calculated on the basis of the determined values which have been obtained before the present ranging cycle and the determined value obtained at the present ranging cycle in Step 116 in the succeeding ranging cycle, that is, at the next light emission time.

If the judgment in Step 122 proves that the number of times or cycles N in "one ranging" is equal to 0, on the contrary, Step 122 is shifted to Step 126. In Step 126, the average A is applied to the output terminal 56.

As a result, an autofocusing system (not shown) is driven to automatically perform a focusing operation, and the camera's shutter is released by further depression of the release button to thereby complete the photographing operation.

If another photographing operation is to be performed, the release button is depressed part way, whereupon affirmation judgment is carried out in Step 100, and then the ranging operation is performed in the same manner as the foregoing case.

The range finder according to the first aspect of the present invention has an excellent effect in that, since the range finder is provided with a control unit for controlling the intensity of light emitted by the light source in accordance with the intensity of reflected light, no wasteful light emitting current is consumed when the subject has a high reflection factor, and hence unnecessary consumption of the battery is avoided. The average number of ranging operations that can be achieved with a single battery is thus greatly increased.

The range finder according to the second aspect of the present invention has an excellent effect in that, since the range finder is provided with a control unit for setting the number of times or cycles N in "one ranging" on the basis of the output value of the light detector, and the number of times or cycles N in "one ranging" is determined on the basis of the output of the light detector, the number of times or cycles N in "one ranging" can be reduced to thereby reduce the total power consumption in the condition where the amount of reflected light from the subject is intense.

Consequently, the range finder according to the present invention responds well to the requirement for reduced power consumption in a camera having a high degree of automation.

Further, the range finder according to the present invention has another excellent effect in that the time taken for each ranging operation can be reduced so that focusing can be rapidly performed in a camera having an automatic focusing system. Moreover, the range finder according to the present invention has a further excellent effect in that the light source and the driver therefore have an extended expected service life.

What is claimed is:

1. A range finder comprising:
   light detecting means for detecting light emitted from a light source which is reflected from a target subject;
   distance calculation means for determining a distance to said target subject on the basis of an output of said light detecting means;
   setting means for providing a value corresponding to a minimum value of the output of said light detecting means which can be processed by said distance calculation means;
   drive means for controlling the intensity of said light source for irradiating said target subject; and
   control means receiving outputs of said light detecting means and said setting means for supplying to said drive means a control signal related to the output of said light detecting means and said value provided by said setting means to cause said light source to emit light in an intensity determined in accordance with said control signal.

2. The range finder of claim 1, wherein the output of said light detecting means varies depending on a position in said light detecting means where the reflected light is projected.

3. The range finder of claim 2, wherein said light detecting means is a position sensitive device.

4. The range finder of claim 3, wherein said light detecting means has two outputs, said distance calculation means determining said distance to said target subject in response to said two outputs, and further comprising means for summing said two outputs, said control means receiving a sum signal output of said summing means as said output of said light detecting means.

5. The range finder of claim 4, wherein said control means comprises: means for determining a difference, as said control signal, between said sum signal output and said value provided by said setting means.

6. The range finder of claim 1, wherein said control means comprises: means for causing said light source to emit a plurality of pulses of light for a single ranging operation; means for dividing said value provided by said setting means by the output of said light detecting means; means for storing an initial value as said control signal; means for multiplying a quotient output produced by said dividing means by a content of said storing means; and means for rewriting the content of said storing means into a product output of said multiplying means; wherein said dividing means, multiplying means, and rewriting means are repeatedly operated every emission of said light source.

7. A range finder comprising:
   a light source for irradiating a target source;
   light detecting means for detecting light emitted from said light source which is reflected from said target subject;
   means for causing said light source to emit a plurality of pulses of light for a single ranging operation;
   distance calculation means for determining a distance to said target subject on the basis of an output of said light detecting means every emission of said light source;
   means, responsive to said output of said light detecting means, for setting a number of times of light emissions of said light source on the basis of said output of said light detecting means; and
   means for determining a final distance value based upon values successively obtained in said distance calculation means.

8. The range finder of claim 7, wherein said determining means includes means for averaging said values successively obtained in said distance calculation means.

9. The range finder of claim 7, wherein the output of said light detecting means varies depending on a position in said light detecting means where the reflected light is projected.

10. The range finder of claim 9, wherein said light detecting means is a position sensitive device.

11. The range finder of claim 10, wherein said light detecting means has two outputs, said distance calculation means determining said distance to said target subject in response to said two outputs, and further comprising means for summing said two outputs, said control means receiving a sum signal output of said summing means as said output of said light detecting means.

12. A range finder comprising:
   a light source;
   a battery for supplying power to said light source;
   position sensitive means for detecting light emitted from said light source which is reflected from a target subject;
   distance calculation means for determining a distance to said target subject on the basis of an output of said position sensitive means;
   setting means for providing a value corresponding to a minimum value of the output of said position sensitive means which can be processed by said distance calculation means;
   control means receiving outputs of said position sensitive means and said setting means for supplying to said drive means a control signal related to the output of said position sensitive means and said value provided by said setting means; and
   drive means for controlling power from said battery to said light source in accordance with said control signal to control an intensity of said light source, whereby a rate of consumption of said battery is reduced.

* * * * *